United States Patent [19]

Eppley et al.

[11] Patent Number: 4,762,757
[45] Date of Patent: Aug. 9, 1988

[54] FLUID CONTROL APPARATUS

[75] Inventors: William J. Eppley, Skippack, Pa.;
Warren E. Hawkins, Brooklyn Park,
Minn.; Paul F. Schisselbauer,
Southampton, Pa.

[73] Assignee: Honeywell Inc., Minneapolis, Minn.

[21] Appl. No.: 73,245

[22] Filed: Jul. 13, 1987

[51] Int. Cl.[4] .............................................. H01M 6/30
[52] U.S. Cl. ...................................... 429/114; 429/116
[58] Field of Search ................. 429/114, 116, 110, 115

[56] References Cited

U.S. PATENT DOCUMENTS

| | | | |
|---|---|---|---|
| 2,862,038 | 11/1958 | Blaru | 429/116 |
| 2,990,442 | 6/1961 | Barnett | 429/114 X |
| 3,332,803 | 7/1967 | Tamminen | 429/114 |
| 4,612,264 | 9/1986 | Fairwood et al. | 429/114 |

FOREIGN PATENT DOCUMENTS 2638645  3/1977  Fed. Rep. of Germany ...... 429/114

*Primary Examiner*—Anthony Skapars
*Attorney, Agent, or Firm*—Mitchell J. Halista; Albin Medved

[57] ABSTRACT

A fluid control apparatus for selectively providing a stored fluid to a working environment for the fluid includes a container for storing the fluid. The container is arranged as a metal thimble with longitudinal score lines evenly spaced about its diameter. A weight is attached to one end of the thimble to provide a force on the thimble in a longitudinal direction as a result of a corresponding acceleration of the thimble. The scoring lines produce stress concentrations and serve to weaken the thimble in its radial direction. The longitudinal force produced by the weight during acceleration results in a collapse of the thimble and a rupture of the walls of the thimble along the score lines to produce exit orifices for the fluid stored in the thimble. In one embodiment of the present invention, the fluid is an electrolyte, and the fluid control apparatus is used in a reserve activated battery housing to store the electrolyte until the acceleration induced collapse of the thimble. The electrolyte is delivered from the ruptured thimble to adjacent electrodes to activate the battery.

12 Claims, 1 Drawing Sheet

FLUID CONTROL APPARATUS

The Government has rights in this invention pursuant to Contract No. FO8635-85-C-0151, awarded by the Department of the Air Force.

BACKGROUND OF THE INVENTION

1. Field of the Invention

The present invention relates to fluid control apparatus. More specifically, the present invention is directed to a fluid control apparatus for selectively and automatically releasing a stored fluid into a working environment for the fluid.

SUMMARY OF THE INVENTION

An object of the present invention is to provide an improved fluid control apparatus for storing a fluid and automatically releasing the stored fluid into a working environment as a result of the application of a stress on the storage container.

In accomplishing this and other objects, there has been provided, in accordance with the present invention a fluid control apparatus including a fluid container means, the fluid container means having longitudinal score lines thereon and a weight means fixedly attached to one end of the fluid container means to impose a force for collapsing the fluid container means in response to an acceleration of the weight means in a direction parallel to the score lines.

BRIEF DESCRIPTION OF THE DRAWINGS

A better understanding of the present invention may be had when the following detailed description is read in connection with the accompanying drawings, in which.

DESCRIPTION OF THE PREFERRED EMBODIMENT

Figure 1:
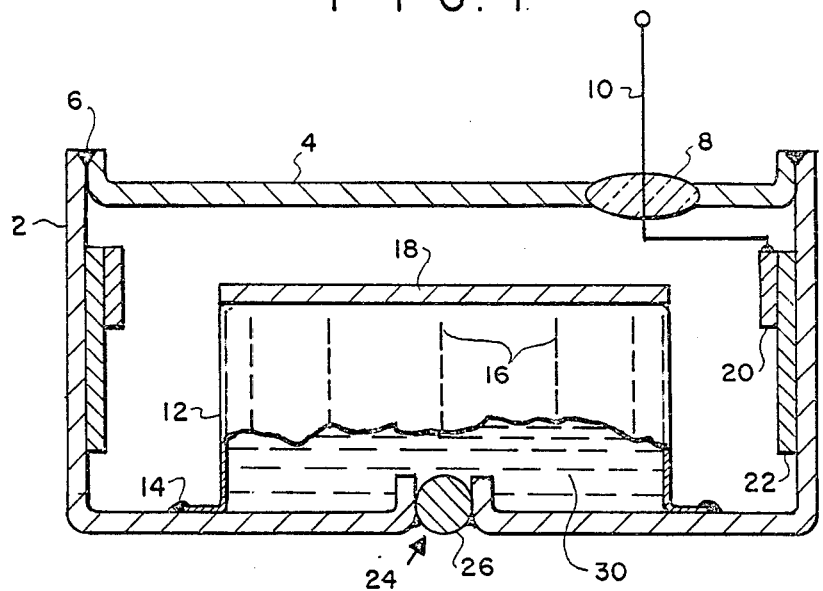
FIG. 1 is a cross-sectional illustration of an embodiment of a fluid control system of the present invention in an inactivated fluid storing state and FIG. 2 is a cross-sectional illustration of a fluid control system shown in FIG. 1 in a fluid releasing state.

Referring to FIG. 1 in more detail, there is shown a fluid control apparatus in an inactivated or fluid storing state including an outer shell 2 and a cover 4 attached to the periphery of the outer shell 2 by any suitable means to provide a fluid-tight connection thereto, e.g., a continuous weld bead 6. In the illustrated embodiment of the present invention, the fluid control apparatus is used in a reserve activated battery and, accordingly, is used to store an electrolyte for the battery. One electrode of the battery is formed by the wall of the shell 2, and the other electrode is located within the shell 2, as hereinafter described. A glass-to-metal seal 8 is located in the cover 4 to enable an electrical wire 10 connected to the internal electrode within the shell 2 to pass through the cover 4 while providing a fluid-tight connection to the cover 4. Within the shell 2 there is located a fluid container in the form of a thimble 12 of a suitable material, e.g., metal. The open end of the thimble 12 is attached to an inner surface of the shell 2 by a suitable means, e.g., a continuous spot weld 14, to effect a fluid-tight connection between the thimble 12 and the inner surface of the shell 2. The thimble 12 is provided with a plurality of score lines 16 longitudinally arranged on an outer surface of the thimble and preferably approximately evenly spaced thereon. A disc 18 is located on the closed end of the thimble 12 to provide a weight for producing an acceleration force on the thimble 12. The disc 18 may be of a suitable material to maximize the acceleration induced force, e.g., lead or tungsten, while maintaining an inert character with respect to the fluid contained within the thimble 12. A ring electrode 20 is attached to the electrical wire 10 and is mounted on an insulating band 22 attached to the inner surface of the shell 2 which electrically isolates the electrode 20 from the shell 2. The ring 20 is also continuously spaced from the thimble 12 to provide electrical isolation therebetween. An electrolyte is stored in the thimble 12 and is retained in the thimble 12 by the fluid-tight connections of the thimble 12 to the shell 2. The electrolyte is introduced into the thimble 12 by an opening 24 in the shell 2. After the thimble 12 has been filled with the electrolyte, the opening 24 is closed by an insert 26 which is attached to the shell 2, e.g., by an interference fit, to provide a fluid-tight stopper for the opening 24 in the shell 2.

Figure 2:
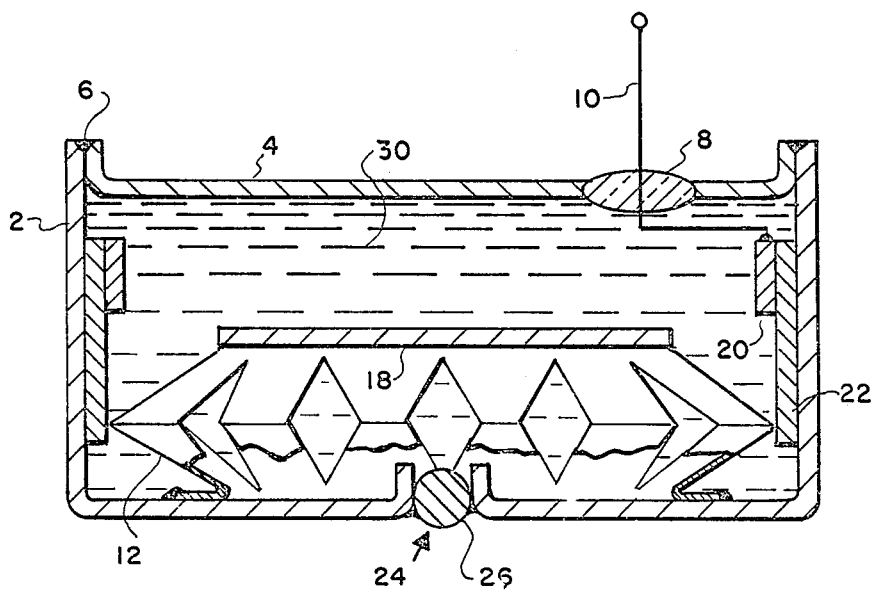

In FIG. 2, there is shown a cross-sectional illustration of the fluid control apparatus of FIG. 1 in an activated or fluid delivering state. This fluid delivering state is the result of the imposition of a longitudinal force, e.g., an acceleration force, on the fluid control apparatus which force may be provided by using the fluid control apparatus in conjunction with an electronic package within an ammunition round or shell. Thus, as illustrated in FIGS. 1 and 2, the fluid control apparatus would provide a source of an electrolyte for a battery used as a power source for associated electronics to produce so-called "intelligent ammunition". In this configuration it is desired that the power source, i.e., the battery, remains dormant until the round is fired. The high acceleration produced by firing the round produces a force on the thimble 12 by the disc 18 in accordance with $F=ma$. The disc 18 is preferably located transverse to the direction of acceleration of the shell 2 while the score lines 16 are arranged parallel to the direction of acceleration. This force is effective to collapse the thimble 12 which ruptures along the score lines 16 while maintaining an overall intrinsic structural cohesiveness to avoid loose pieces within the shell 2. The rupturing of the thimble 12 is effective to release or deliver the electrolyte 30 into the interior of the shell 2. The spinning of the shell 2 after firing distributes the electrolyte to the sides of the interior of the shell 2 where it contacts the inner surface of the shell 2 forming one electrode of the battery and the other battery electrode provided by the electrode 20. Thus, all the active surfaces are wetted by the electrolyte, and the power source is activated to power the associated electronic package.

Accordingly, it may be seen that there has been provided, in accordance with the present invention an improved fluid control apparatus for selectively providing a fluid to a working environment.

The embodiments of the present invention in which an exclusive property or privilege is claimed are defined as follows:

1. A fluid control apparatus comprising
   a housing means defining a fluid-tight interior volume,
   a fluid container means located within said volume,
   at least one score line located on an exterior surface of said fluid container means and a weight means fixedly attached to said fluid container means for producing a rupture of said fluid container means along said score line in response to a force produced by said weight means during an acceleration of said weight means and said container means, said score line being parallel to the direction of the acceleration.

2. A fluid control apparatus as set forth in claim 1 wherein said score line includes a plurality of substantially evenly spaced score lines arranged on the exterior surface of said container means.

3. A fluid control apparatus as set forth in claim 1 wherein said fluid container means includes a metal thimble and said weight means extends across a closed end of said thimble transversely to the direction of the acceleration.

4. A fluid control apparatus as set forth in claim 3 wherein said weight means includes a metal disc.

5. A fluid control apparatus as set forth in claim 1 and further including a pair of battery electrodes located within said interior volume and with at least one of said electrodes being external to said container means and wherein the fluid stored in said fluid container is a battery electrolyte.

6. A fluid control apparatus as set forth in claim 5 wherein said housing means includes an electrode wire connected to one of said electrodes and a fluid-tight seal for allowing passage of said wire out of said housing means while maintaining the fluid-tight condition of said interior volume.

7. A fluid control apparatus as set forth in claim 3 wherein said housing means includes a metal cup, a metal cover for an open end of said cup, and a peripheral weld between said cup and said cover to form a fluid-tight seal therebetween.

8. A fluid control apparatus as set forth in claim 7 wherein said thimble is welded to an interior bottom surface of said cup to form a fluid-tight cover for an open end of said thimble.

9. A fluid control apparatus as set forth in claim 8 wherein said metal cup includes a fluid fill passage extending through a wall of said cup into said thimble and a fluid seal element within said passage to provide a fluid-tight seal therewith.

10. A fluid control apparatus as set forth in claim 8 and further including at last one battery electrode located within said cup and external to said thimble.

11. A fluid control apparatus as set forth in claim 10 wherein said housing means includes an electrode wire connected to said electrode and a fluid-tight seal for allowing passage of said wire out of said housing means while maintaining the fluid-tight condition of said interior volume.

12. A fluid control apparatus as set forth in claim 3 wherein said score line includes a plurality of substantially evenly spaced score lines arranged on the exterior surface of said thimble.

* * * * *